June 17, 1969  L. E. TYLER  3,450,431
DUAL CLOSURE MEANS FOR AGRICULTURAL TRANSPORT DEVICES
Filed June 28, 1968

INVENTOR.
LOREN E. TYLER
BY Donald R. Hjostrom
ATTORNEY

INVENTOR.
LOREN E. TYLER
BY
ATTORNEY

United States Patent Office 3,450,431
Patented June 17, 1969

3,450,431
DUAL CLOSURE MEANS FOR AGRICULTURAL TRANSPORT DEVICES
Loren E. Tyler, Wayzata, Minn., assignor to Letco, Inc., Long Lake, Minn., a corporation of Minnesota
Filed June 28, 1968, Ser. No. 741,089
Int. Cl. B60p *7/02;* B65d *51/08, 43/24*
U.S. Cl. 296—100                                17 Claims

ABSTRACT OF THE DISCLOSURE

An agricultural fertilizer spreader having a hopper or tank with a generally flat top with a large rectangular opening therein and with an upstanding flange around the periphery of the opening and with a pair of rigid overlapping doors hinged at the front and rear of the hopper, respectively, and cooperating to provide a weatherproof closure means for the opening in the hopper. The doors each having peripheral downwardly extending flanges which enclose the flange on the hopper when the doors are closed, the door hinged at the rear of the hopper having an open channel at its forward end and the door hinged at the front of the hopper overlapping the channel and having a downwardly extending flange at its rear end which extends into the channel when the doors are closed.

BACKGROUND OF INVENTION

This invention relates to closure means for agricultural transport devices of the type which are towed by a tractor or truck or are truck mounted and utilized for transporting and distributing dry fertilizer, feed, or the like. These machines are generally relatively large and may have a hopper capable of carrying several tons of fertilizer or feed per load. Fertilizer spreaders of this type include power driven apparatus for metering the fertilizer material from the hopper and for distributing it onto the field to which it is to be applied. Feed handling machines include power driven apparatus for unloading the feed into a bunk or bin.

Such machines are well known and are commercially available from many sources.

Generally the hopper on machines of the type described above has a generally flat top with a large opening therein so that the hopper can be easily filled with material. Customarily this opening is covered by a piece of canvas or similar material which must be tied down to the hopper. These covers have been a source of considerable problems to the users of the machines. First of all, the covers have been difficult to handle, particularly under windy conditions. Furthermore, they normally do not provide a completely weatherproof cover and a combination of wind and rain normally could be expected to result in the contents of the hopper becoming wet. Also, when the machine is transported at relatively high speeds, the air tends to lift the canvas cover and may cause material in the hopper to blow out of it.

BRIEF SUMMARY OF INVENTION

This invention provides improvement over the prior transport devices, such as fertilizer spreaders, by providing a weatherproof cover or closure means for the hopper which seals out rain and wind, is easy to handle, can be flipped open and closed in seconds, and which actually is forced closed when the machine is towed or otherwise transported at high speeds so that there is no danger of it opening.

Specifically, the closure means comprises a pair of relatively rigid doors which together are of sufficient size to cover the opening in the hopper. Each of these doors has a mating edge and they are hinged on opposite sides of the opening in the hopper whereby the doors open back against the top of the hopper and close across the opening with their mating edges cooperating to provide a seal. The doors and hinges are of sufficient strength so that the doors may be flipped open and closed and allowed to fall into their open or closed position without damage. Preferably a shock absorbing bumper means is provided between each of the doors and the top of the hopper to cushion the shock when the doors are dropped open. Also, in the preferred form the doors utilized include a unique construction whereby the doors have a convex, pyramidal shape, as seen from the top, the pyramidal shape being made up of four isosceles triangles having their bases arranged along the four sides of a rectangular base portion of the door and with the line of intersection between adjacent surfaces extending from this base portion to a common point of intersection at the geometric center of the door. The construction is such that the height of the door, from this common point of intersection to the plane of the base portion, is relatively small compared to the overall dimensions of the door. Also, in a preferred arrangement, the door is reinforced by the use of a plurality of reinforcing ribs secured to the underside of the door and including at least one rib along each of the lines of intersection of the various surfaces of the door and all of these ribs meeting at the geometric center of the door and being secured together there.

In a preferred form the door which is hinged near the rear of the hopper has, along its mating edge, a channel member with its opening facing upwardly and the door which is hinged near the front of the hopper has a downwardly extending flange along its mating edge. When the doors are closed, the front door overlaps the rear one and the downwardly extending flange extends into the opening of the channel member to provide a seal. Thus, when the device on which the doors are mounted is transported in its normal direction of motion, the movement of air over the doors forces them closed so that there is no requirement for a latch to keep the doors from being lifted open by the air. The doors may include a downwardly extending flange all of the way around their peripheries and the hopper provided with an upstanding flange around its periphery and constructed so that the flanges of the doors enclose the flange on the hopper when the doors are closed to improve the seal.

Therefore, an object of the invention is to provide a weathertight cover or closure means for an agricultural transport device such as a fertilizer spreader.

Another object of the invention is to provide a cover as aforesaid, which is quickly and easily opened and closed.

Another object of the invention is to provide a closure means as aforesaid comprising a pair of doors and shock absorbing means between the doors and the device on which they are mounted so that the doors can be flipped and allowed to fall open or closed without damage.

Another object of the invention is to provide a weathertight cover for a fertilizer spreader or the like, comprising two rigid overlapping doors hinged on the hopper of the spreader and cooperating with an upstanding flange on the hopper to seal out rain, wind, and the like.

Still another object is to provide a cover as aforesaid, wherein the doors open flat against the top of the hopper to provide ready access to the hopper for loading.

A further object of the invention is to provide a construction whereby the doors are urged closed by air flow over the machine when it is towed in a forward direction.

Another object of the invention is to provide a new door structure having improved strength and rigidity and particularly applicable to transport devices such as agricultural fertilizer spreaders.

These and other objects will become apparent upon reading the following detailed description of the invention.

DETAILED DESCRIPTION

Figure 1:
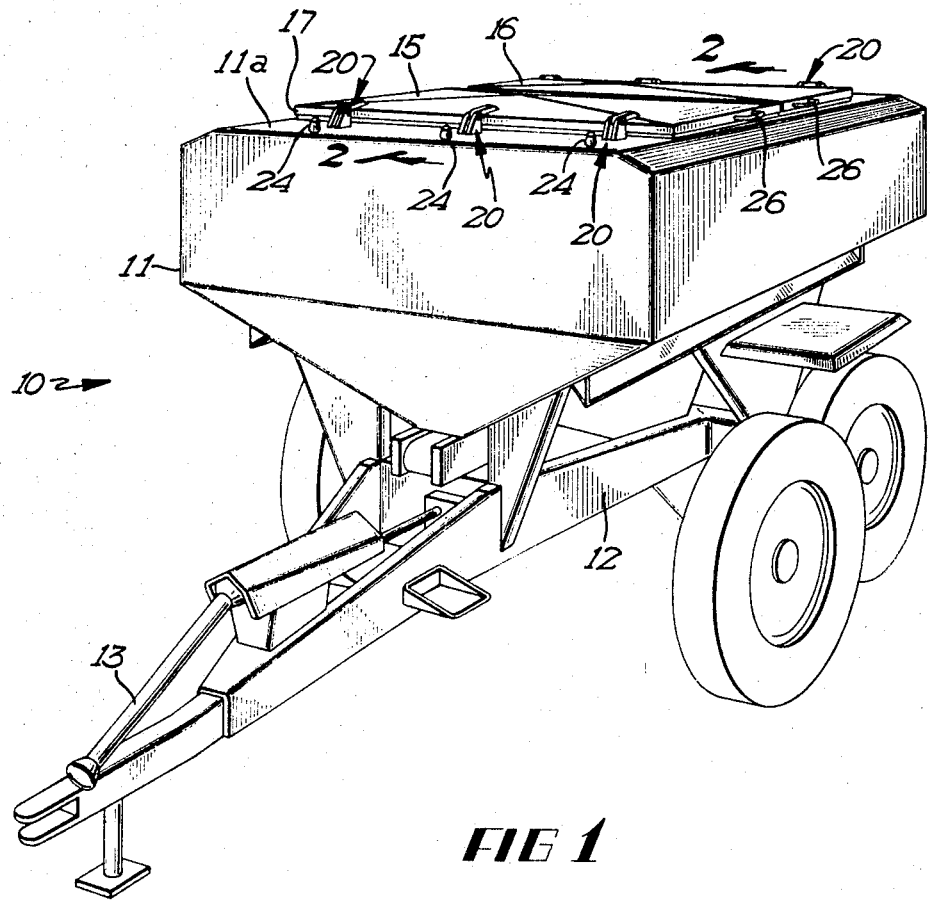
FIGURE 1 discloses in perspective an agricultural fertilizer spreader having a weatherproof closure structure constructed according to this invention.

Referring to the drawing, reference numeral 10 refers generally to an agricultural fertilizer spreader having a tank or hopper 11 mounted on a frame 12 which is provided with a plurality of wheels and which is adapted to be connected to a truck or tractor for towing. It should be noted that the hopper may also be mounted directly on a truck. The spreader includes means for metering fertilizer from the hopper and means for distributing the fertilizer as the spreader is propelled through a field. However, since the present invention is not concerned with the operation of the metering and distributing means, they have not been disclosed. Normally the distributing means is driven from one of the wheels of the spreader so that it is directly correlated to the ground speed of the spreader and the distributing means is normally driven from a power source such as the power take-off of the truck or tractor through a power take-off shaft 13 which is disclosed in the drawing.

Figure 2:
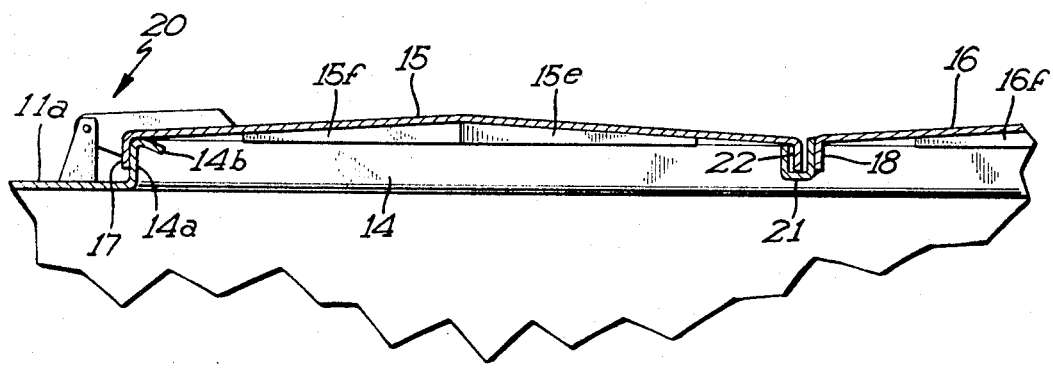
FIGURE 2 is a fragmentary cross-sectional view taken generally along line 2—2 in FIGURE 1.

Hopper 11 is a large generally rectangular structure constructed of a material such as steel and capable of holding a large quantity of powdered or other dry fertilizer. It has a generally flat top 11a which has a relatively large rectangular opening 11b formed therein therein through which the hopper is loaded. It will be noted that opening 11b has sides which extend parallel to the direction of movement of the spreader when it is pulled and this direction may be referred to as the longitudinal direction of the spreader. The ends of the opening are transverse to this direction. Around the periphery of opening 11b, hopper 11 is provided with an upstanding flange 14 which may be a continuous flange or which may be four separate flanges, one along each of the longitudinal sides and one along each of the transverse ends. Preferably, flange 14 includes a generally vertically extending portion 14a (see FIGURE 2) and an inturned generally horizontal portion 14b. This tends to strengthen and rigidize the hopper and at the same time assures that no sharp edge is exposed when the doors are opened. The size of flange 14 has been somewhat exaggerated in the drawing for the sake of clarity.

Hinged on the top surface of hopper 11 are a pair of doors 15 and 16, hinged adjacent the front and rear ends of opening 11b, respectively. Doors 15 and 16 are substantially identical except for one detail which will be discussed hereinafter. Each of the doors is generally rectangular and slightly pyramidal so that it is convex when viewed from the top side and has four isosceles triangular surfaces each with its base forming one side of the rectangular base portion of the door and with the lines of intersection between adjacent surfaces extending from the base portion and meeting at a common point at the geometric center of the door. On the underside, the doors are preferably provided with a plurality of reinforcing ribs as disclosed in FIGURE 3.

These ribs on door 15 may include diagonal ribs 15a through 15d and longitudinal ribs 15e and 15f, all of which are welded to the under surface of the door and welded together at the center. Similar ribs are provided on door 16. In a typical machine each of the doors measured approximately three and one-half by six feet and weighed approximately seventy pounds. The pyramidal shape and the reinforcing ribs render the doors extremely strong and rigid. Preferably the height of the door (the distance from the plane of the base portion to the common point of intersection at the center) is small relative to the dimensions of the base portion.

Door 15 includes what will be referred to as a peripheral portion including the two longitudinal sides and the hinged edge (comprising three sides of the base portion) and along this portion there is formed a downwardly extending flange 17. Similarly, door 16 includes a peripheral portion including the longitudinal sides and the hinged edge. This peripheral portion has a downwardly extending flange 18.

The particular kind of hinges used for securing the doors to the hopper is not critical. By way of example, hinges 20 have been used in this disclosure. Each of these hinges includes a pair of spaced upstanding members welded to the top of the hopper and a cooperating member extending from the hinged edge of the door and disposed between the two upstanding members and pivoted thereto by means of a pin. In the preferred arrangement, three of these hinges are utilized to secure each of the doors to the hopper. As indicated, the particular form of hinge used is not critical so long as the hinges have substantial strength and shock resistance and are constructed so that the doors may be opened back against the top surface of the hopper so that they do not interfere with loading the spreader. With the doors opening in this manner the spreader can easily be filled either from the side or from the top as can be seen from FIGURE 3.

Opposite the hinged edges of doors 15 and 16 they have what shall be referred to as mating edges. Along the mating edges of door 16 there is provided a U-shaped channel member 21 (see FIGURES 2 and 3) which is open towards the top. In the preferred arrangement, the peripheral flange 18 continues around this mating edge of door 16 and channel 21 is simply welded to flange 18 along the mating edge. Door 15 is provided with a downwardly extending flange 22 along its mating edge. This flange may be, and in the preferred embodiment is, merely a continuation of peripheral flange 17. Doors 15 and 16 are constructed so that they overlap each other when they are closed and meet substantially at the longitudinal center of the opening 11b in the hopper. The doors are large enough so that peripheral flanges 17 and 18 are outside of, and substantially enclose, flange 14 on the hopper when the doors are closed. In order that door 16 may close completely, flange 14 is notched substantially at the longitudinal center of the opening 11b, on each side of the opening. These notches, designated by the numeral 23, accept channel 21 which is of sufficient length so that it extends slightly outward beyond flange 14 on each side of the hopper. Channel 21 is slightly shorter than the entire width of door 16 (which is preferably the same width as door 15) so that downwardly extending flange on door 15 extends thereinto when the doors are closed. This can best be seen with reference to FIGURE 2. Preferably a shock absorbing means, such as a plurality of rubber bumpers 24 are provided on the top surface 11a of hopper 11 to absorb the shock when the doors are opened and dropped against the top of the spreader.

Figure 3:
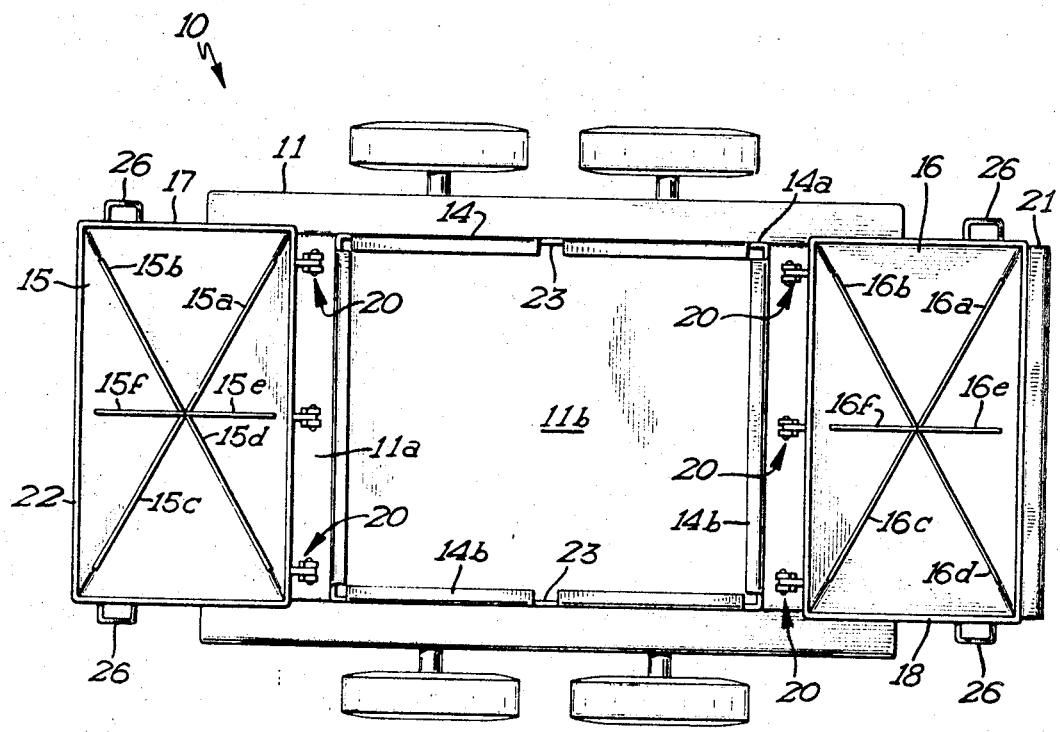
FIGURE 3 is a somewhat schematic top view of the spreader with its doors open.
Figure 4:
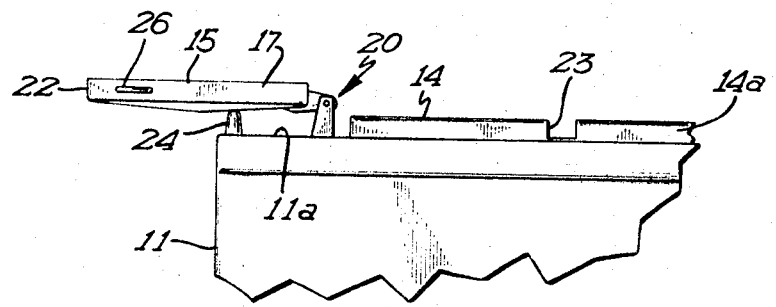
FIGURE 4 is a fragmentary cross-sectional view taken generally along line 4—4 of FIGURE 3.

When the doors 15 and 16 are closed, peripheral flanges 17 and 18 thereon enclose upstanding flange 14 on the hopper. Flange 22 on door 15 extends into channel 21 on door 16 and this channel extends outward beyond flange 14 on each side of the spreader. Thus, a weatherproof cover is provided for the spreader. The doors can easily be opened and closed, there normally being provided a plurality of handles 26 on the doors. As can be seen in FIGURES 3 and 4, the doors 15 and 16 overhang the ends of the hopper when they are open. This renders them easily engageable by and/or with a pole or the like, so that they can be flipped or thrown over center and allowed to fall closed. Similarly, handles 26 may be grasped and the doors flipped open with the bumpers 24 cushioning the shock as they fall open. Thus, the doors can be opened or closed in seconds. It will be appreciated that the strength and rigidity of the doors, as well as strength and shock resistance of the hinges, is essential to assure that the machine will not be damaged when the doors are so opened and closed.

It was noted that the channel is formed on the rear door 16 while the flange which extends thereinto is on door 15. This performs a very important function in that, should the spreader be drawn at a relatively high rate of speed, the air flow over the top of the spreader will force door 15 downward to press the doors tightly closed. If it were not for this provision, some sort of latch would have to be provided so that the doors could not be opened by the wind.

A preferred embodiment of the invention as utilized in a fertilizer spreader has been described herein by way of example. The invention is also applicable to machines for transporting other dry particulate material, such as feed or the like. Although the doors have been described as made of steel or the like and of a welded construction, they may be constructed of some other material such as molded plastic, if desired. They may also have a shape other than the rectangular based, pyramidal shape, described.

The embodiments of the invention in which an exclusive property or right is claimed are defined as follows:

1. In combination with an agricultural transport device including a hopper with a generally flat top and with a relatively large door opening therein: a pair of relatively rigid doors, together of sufficient size to cover said opening and each including a mating edge; hinge means mounting said doors on opposite sides of said opening whereby said doors open back against the top of said hopper and close across the opening with said mating edges cooperating to provide a seal, said doors and said hinge means being of sufficient strength so that the doors may be flipped open or closed and allowed to fall to their open or closed positions without damage; and shock absorbing bumper means associated with each of said doors and disposed so that they are between the door and the top of the hopper to cushion the shock when the door is dropped open.

2. The combination of claim 1 wherein: the opening in said hopper ad the doors therefor are of such size relative to the top of the hopper that a substantial portion of each of said doors overhangs the hopper at the ends thereof when the doors are open whereby the doors can easily be engaged and flipped closed; and wherein the shock absorber means for each of said doors is mounted on the hopper, between the hinge means and the end of the hopper.

3. The combination of claim 1 wherein: each of said doors has a rectangular base portion and is convex as seen from the top and including four isosceles triangular surfaces each with a base forming one side of said rectangular base portion and with the lines of intersection of each two adjacent surfaces extending from said base portion to a common point at the geometric center of the door; and the height of said door, from said common point to the plane of said base portion, is small relative to the dimensions of said base portion.

4. The combination of claim 1 wherein: said doors are hinged so that their mating edges meet along a line transverse to the normal direction of travel of the device, which direction of travel defines a front and a rear of the device; and said doors, and the mating edge thereof, are constructed so that the front one of said doors overlies the rear one thereof when said doors are closed whereby air flow there over during movement of the device urges said doors closed.

5. Closure means for an agricultural transport device including a hopper having a top door opening therein, the closure means comprising: a pair of relatively rigid doors; means hinging said doors at opposite sides of the opening; said doors each having a peripheral portion and a mating edge; each of said doors having downwardly extending peripheral flange means along its peripheral portion; channel means with an upward facing opening along the mating edge of one of said doors; downwardly extending mating flange means along the mating edge of the other of said doors; and the doors overlying the opening with the downwardly extending peripheral flange means thereon cooperating with the top of the body, and with their mating edges overlapping with the mating flage means on said one door disposed in the channel of said other door to provide a seal when the doors are closed.

6. The closure means of claim 5 further including upwardly extending flange means on the hopper and extending around the periphery of said opening; and the downwardly extending peripheral flange means on the doors enclosing the flange on the tank when the doors are closed.

7. The closure means of claim 5 wherein each of the doors is hinged so that it can be opened back against the top of the hopper adjacent the door opening; and the device includes shock absorbing bumper means associated with each of the doors and mounted to be disposed between the door and the top of the hopper when the door is open.

8. The closure of claim 5 wherein said doors are hinged so that their mating edges meet along a line transverse to the normal direction of travel of the device, which direction of travel defines a front and a rear of the device; and said doors are hinged so that the mating edge of said one door is disposed forward of its hinging means and the mating edge of said other door is disposed to the rear of its hinging means when the doors are closed.

9. The closure means of claim 5 wherein each of said doors is pyramidal and convex as seen from the top, and has a plurality of stiffening ribs on the underside thereof.

10. The closure means of claim 5 wherein: each of said doors has a rectangular base portion and is pyramidally convex as viewed from the top with four isosceles triangular surfaces, each with a base forming one side of the base portion of the door and with said four triangular surfaces all meeting at the top center of the door; and wherein the height of said door is small relative to the dimensions of the base.

11. The closure means of claim 6 wherein the flange means on the hopper is notched on opposite sides of the opening to receive the channel means on said one of the doors.

12. The closure means of claim 6 wherein the upwardly extending flange on the hopper includes a vertical portion and a horizontal portion extending from the upper end of said vertical portion toward said opening so that said flange provides a sealing member for cooperation with the doors, provides a smooth edge around the opening in the hopper, and acts as a stiffening member for the hopper.

13. The closure means of claim 12 wherein the flange on the hopper has a portion removed on opposite sides of the opening and substantially at the longitudinal center thereof to accommodate the channel on said one of the doors.

14. The closure means of claim 13 wherein the two sides of said doors extend generally parallel to the direction of travel of the device and the hinged edges extend generally normal thereto; the hopper has forward and rear ends as determined by its normal direction of travel; and said doors are hinged so that the mating edge of said one door is forward of the hinged edge thereof and the mating edge of said other door is rearward from the hinged edge thereof when the doors are closed.

15. A door for an agricultural transport device or the like comprising a pyramidal structure with a convex top projection and a concave bottom projection, the structure comprising four isosceles triangular surfaces arranged with the bases thereof defining the four sides of a rectangle and with the line of intersection between each two adjacent ones of said surfaces extending to a common point of intersection of all four of said surfaces at the geometric center of said structure, and the height of said door, as measured from the plane of said base, being small relative to the dimensions of said base.

16. The door structure of claim 15 including a plurality of reinforcing ribs on the underside of said door structure and including a rib running along the line of intersection between each of the adjacent surfaces, and all of said reinforcing ribs meeting and being joined together at the geometric center of the door.

17. The door structure of claim 15 further including a continuous depending flange extending from said base portion and extending generally normal to the plane thereof.

References Cited

UNITED STATES PATENTS

| | | | |
|---|---|---|---|
| 856,453 | 6/1907 | Dunstone | 220—85 XR |
| 2,739,729 | 3/1956 | Tenas | 220—29 |
| 3,069,199 | 12/1962 | Readon et al. | 296—100 |

GEORGE T. HALL, *Primary Examiner.*

U.S. Cl. X.R.

217—60; 220—29; 296—2, 104